United States Patent

Manjikian

[15] 3,698,559

[45] Oct. 17, 1972

[54] REVERSE OSMOSIS MODULE SUITABLE FOR FOOD PROCESSING

[72] Inventor: Serop Manjikian, Del Mar, Calif.

[73] Assignee: The United States of America as represented by the Secretary of the Interior

[22] Filed: March 1, 1971

[21] Appl. No.: 119,737

[52] U.S. Cl. ................... 210/321, 210/323, 210/433, 210/456
[51] Int. Cl. .............................................B01d 31/00
[58] Field of Search........210/456, 490, 23, 321, 433, 210/323

[56] References Cited

UNITED STATES PATENTS 3,616,929  11/1971  Manjikian..................210/321
3,612,282  10/1971  Cheng.......................210/321
3,400,825  9/1968   Shippey.....................210/321

Primary Examiner—Frank A. Spear, Jr.
Attorney—Ernest S. Cohen and Albert A. Kashinski

[57] ABSTRACT

A reverse osmosis module has a pressure housing containing a number of RO elements with membrane covered outer surfaces. Inside the housing a stuffer surrounds the elements, with the interior surfaces of the stuffer spaced a uniform distance from the membranes. When liquid is passed through the module between the membranes and the stuffer, the spacing between them promotes controlled, uniform, liquid flow. The RO module is particularly suited for food processing.

8 Claims, 8 Drawing Figures

PATENTED OCT 17 1972 3,698,559

INVENTOR.
SEROP MANJIKIAN
BY
AGENT

INVENTOR.
SEROP MANJIKIAN
BY
AGENT

PURIFIED WATER

BRINE OR CONCENTRATE

FEED LIQUID

INVENTOR.
SEROP MANJIKIAN
BY
AGENT

REVERSE OSMOSIS MODULE SUITABLE FOR FOOD PROCESSING

BACKGROUND OF THE INVENTION

In reverse osmosis is accomplished by applying a solution to be purified is fed under pressure to one side of a semipermeable membrane. The membrane passes water or solvent but prevents the passage of salts or dissolved solids. The original solution becomes concentrated and is usually discarded. The process is also applicable to the treatment of solutions such as foods, beverages and by-products in which the concentrate is the desired product and the liquid passing through the membrane is discarded or considered secondary.

Several types of membrane supports are employed in reverse osmosis modules. One type employs flat membrane sheets supported on porous plates or grids, a number of such plates being stacked into a plate and frame assembly. Another type employs sheet-like porous elements interleaved with a semipermeable membrane sheet, the combination being rolled into a spiral pack. Feed solution is introduced into one end of the pack, while brine is discharged from the other end and product water is collected from the porous element facing the membrane. Another type of module employs porous, pressure-resistant tubes with semipermeable membranes on their inner surfaces. Still another type employs membrane tubes in the form of very fine, hollow fibers.

An improved type of module is one which employs support structures enclosed in a pressure container and having semipermeable membranes on their outer surfaces, particularly helically wound membrane elements as described and claimed in my copending Patent application Ser. No. 818,514 filed Apr. 23, 1969, and Continuation-in-part application, Ser. No. 39,104, filed May 20, 1971, now U.S. Pat. No. 3,616,929. Such helically wound membrane elements are efficient in operation, and are easy to clean and replace since the membrane surface is on the outside of its support structure. In a pressure container such elements should be arranged so that feed liquid flows evenly and preferably turbulently over the membrane surfaces so that uniform liquid flow is achieved and stagnant areas which can result in deleterious collection or precipitation of insoluble solids and slime are avoided. In concentration processes, such as in food processing, elimination of low flow or stagnant areas is of even greater importance since the feed solutions are likely to be originally more viscous, and may contain appreciable amounts of insoluble solids. Additionally, for food processing, the module must be easily cleaned or sterilized when necessary and narrow channels and cracks and crevices where particles may lodge or collect are undesirable. Careful control of liquid flow over the membrance surfaces is necessary to obtain desired turbulent flow without inordinately high pumping cost.

SUMMARY OF THE INVENTION

Summarized briefly, the reverse osmosis module of this invention comprises a pressure resistant container enclosing a plurality of membrane elements having membrane covered outer surfaces. Feed liquid is introduced into this container, concentrated liquid is discharged, and purified liquid is collected from the interiors of the membrane elements. In the pressure container is a stuffer which surrounds and partly stuffs or fills up the space around the membrane elements. The stuffer has interior bore surfaces spaced apart preferably uniformly from the membrane covered surfaces of the membrane elements. Means are provided to introduce the feed liquid into the spaces between the interior surfaces of the stuffer and the membranes so that the liquid is passed preferably uniformly over the membrane.

DESCRIPTION OF THE PREFERRED EMBODIMENT

Figure 1:
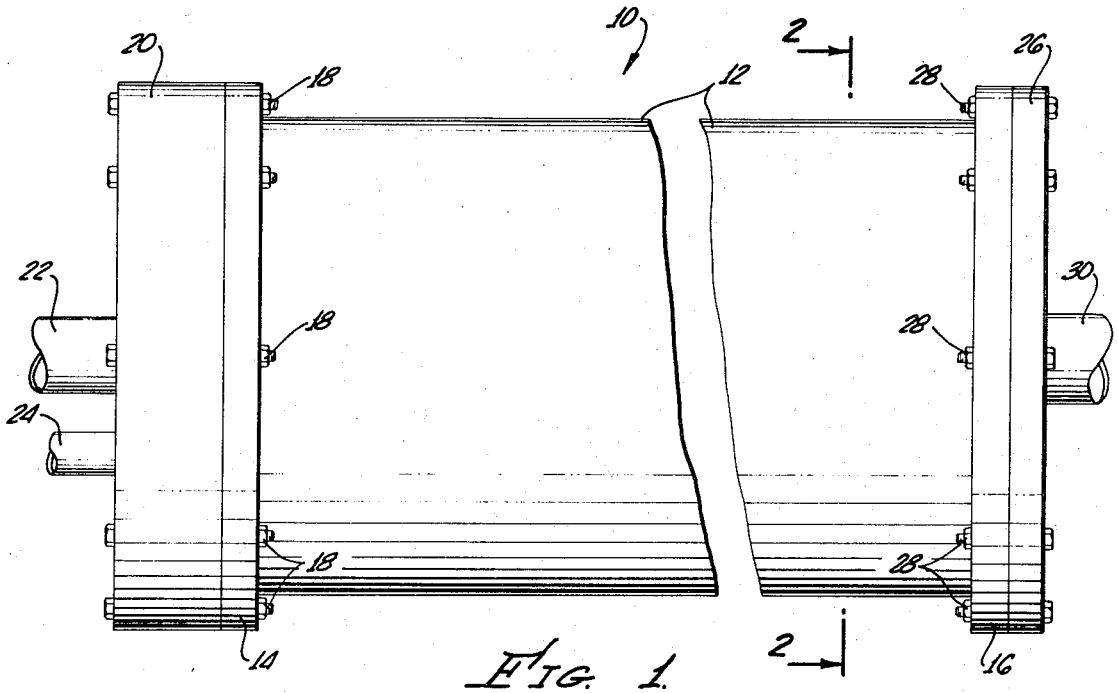
FIG. 1 shows a general side view of a reverse osmosis module.
Figure 2:
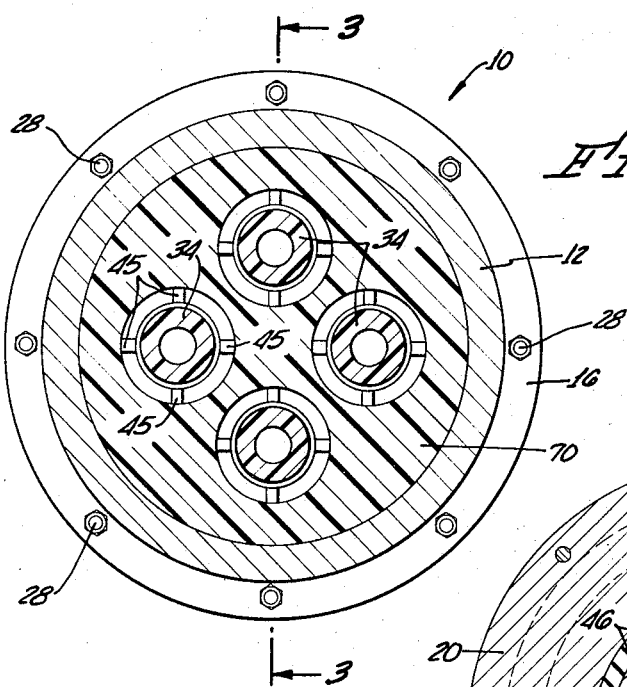
FIG. 2 shows a vertical transverse section of the module of FIG. 1 taken along the line 2—2.

Referring particularly to FIGS. 1 and 2, a reverse osmosis module 10 comprises a cylindrical outer shell 12 of metal or high strength plastic of sufficient thickness to resist the pressures employed in operation. Flanges 14 and 16 are welded onto the ends of the cylindrical shell 12. By bolts 18, a relatively thick end plate 20 is attached to flange 14. Threaded connectors 22 and 24 pass through end plate concentrated liquid and purified liquid respectively, as will be hereinafter described in more detail. At the other end a thinner end plate 26 is attached to flange 16 by bolts 28. On the end plate 26 is a connector 30 for introduction of feed liquid.

Figure 3:
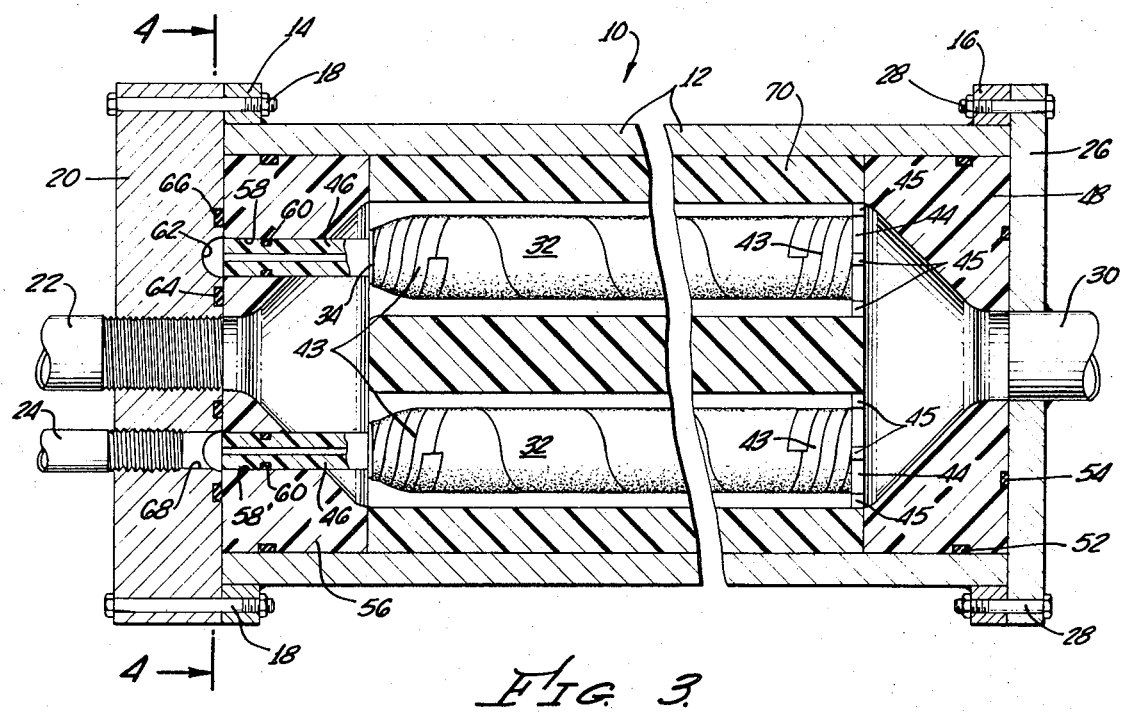
FIG. 3 shows a vertical longitudinal section of the module taken along the line 3—3 of FIG. 2.
Figure 4:
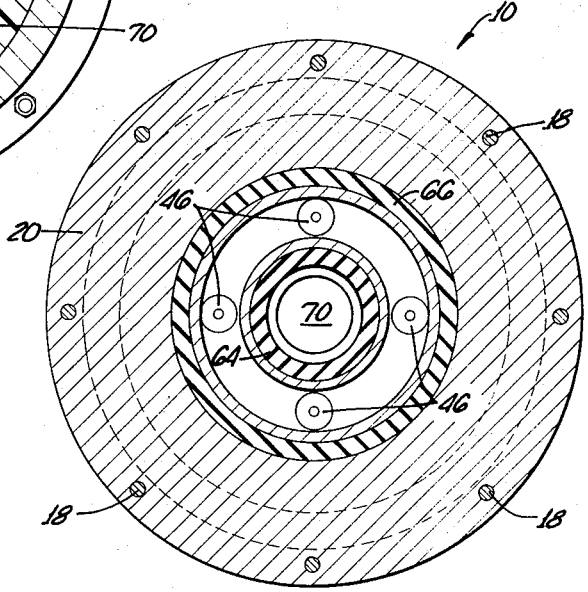
FIG. 4 shows a vertical transverse section of the module taken along the line 4—4 of FIG. 3.
Figure 6:
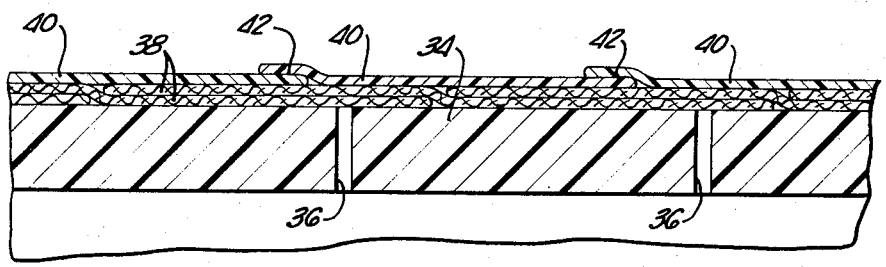
FIG. 6 shows, much enlarged, a longitudinal, fragmentary section of a membrane element, illustrating the backing cloth and membrane helical windings.
Figure 5:
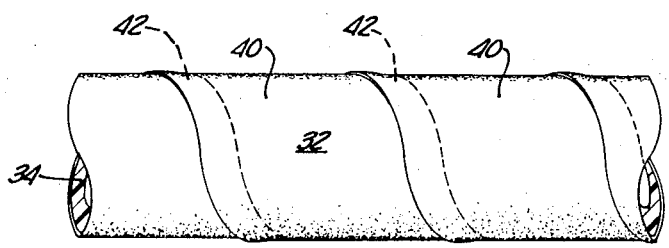
FIG. 5 shows a much enlarged portion of one of the membrane elements, illustrating the helical wound membrane covering.

Inside shell 12 are arranged a plurality of membrane elements 32, as will be seen in FIGS. 2, 3 and 4. These are formed by helically winding backing cloth and membrane strip around a porous support tube 34, as will be seen particularly in FIG. 3 and detailed views in FIGS. 5 and 6. The porous support 34 may be a tube of high strength plastic with perforations 36 as seen in FIG. 6. Around support 34 is helically wound a strip of porous nylon cloth 38, this winding being overlapped for one half the width of the cloth strip so that one strip and one winding forms a double layer over the support tube surface. Such a double cloth layer provides a permeable structure for lateral transfer of product water to perforations 36; it bridges over these perforations to prevent cupping of the membrane; and it provides a smooth yet permeable surface to support the membrane. Over cloth layers 38 is helically wound a semipermeable membrane strip 40 with contiguous overlapping edges 42. The overlapped membrane areas 42 are sealed by a suitable adhesive or bonding agent.

For example a mixture of triacetin and 1-propanol, or an epoxy type adhesive may be employed such as that marketed as type PDT-1554 by Eastman Chemical Company. The ends of the wound membrane strip are sealed to the imperforate end surfaces of support tube 34 by a pressure sensitive adhesive tape winding 43.

At one end, each membrane element support tube 34 is fitted with a blind plug 44 from which project spacers 45, as seen in FIG. 3. At the other end, as shown in detail in FIG. 7, the tube 34 is fitted with an elongated, projecting, bored plug 46 which communicates with an internal bore in tube 34. Plugs 44 and 46 are both sealed in place in the ends of support tube 34 by a suitable adhesive.

At the inlet end of module 10, that is the right hand end in the embodiment illustrated, the inside of the shell 12 is fitted with a bored end piece 48 which is flared internally to distribute feed water, entering the module through connector 30, uniformly over the membrane covered surfaces of membrane elements 32. End piece 48 is sealed to the interior wall of shell 12 by O-ring 52 and to end plate 26 by O-ring 54.

Figure 7:
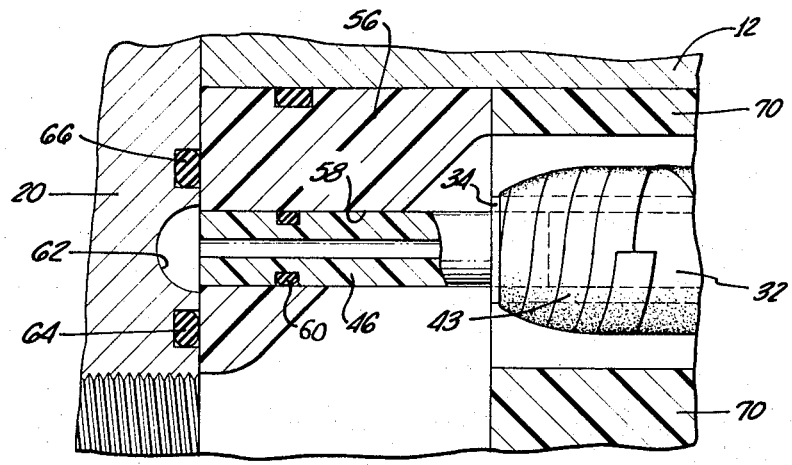
FIG. 7 shows an enlarged fragmentary section of one end of a membrane element illustrating in more detail an end fitting and purified water transport tube.

Inside shell 12 at the other end is support member 56 having a flared or expanding central orifice and a number of bores 58, as seen more clearly in FIG. 7. Into bores 58 are located projecting plugs 46 from membrane elements 32, these being sealed to the interior walls of bores 58 by O-rings 60. Abutting against the end face of support member 56 is end plate 20 which, as also will be most clearly seen in FIG. 7, contains annular groove 62 which communicates with ends of bores 58 in support member 56 and thereby also with the bores in projecting element plugs 46. Annular groove 62 is surrounded by inner O-ring 64 and by outer O-ring 66. These inner and outer O-rings 64 and 66 seal the annular groove 62 to the end face of support member 56.

Also communicating with annular groove 62 and passing through end plate 20 is a passage 68 which communicates at its outer end with purified water connector 24, which is threaded, as previously described, into end cap 20. Thus, purified water collecting in the interiors of membrane elements 32 is transferred through the bores in end plugs 46 to annular groove 62, thence to passage 68 and connector 24 and thence to piping, not shown, for transfer to storage or use.

An important feature of this invention is provision of a "stuffer" 70, which stuffs or partly fills up the space inside module 10. It forms a shroud or flow tube to surround each of the membrane elements 32, having interior bores with surfaces spaced apart preferably a uniform distance from the surfaces of membrane elements 32. It will be seen in FIG. 2, for example, that stuffer 70 surrounds each of the four membrane elements 32 and that the distances between the interior surfaces of the stuffer and the outer surfaces of the membrane elements are all the same. This uniformity of spacing results in most desirable liquid flow control, the feed water being passed uniformly over the membrane surfaces. The magnitude of the spacing between the membrane surfaces and the stuffer surfaces may be arranged to suit operating requirements. If impure water or other clear solution is being treated then the clearance may be relatively small. If food products containing an appreciable percentage of solids are being processed then the clearance should be larger to avoid clogging the flow passages. Most often the clearance or spacing will be selected to provide turbulent flow over the membrane surface so that formation of a boundary layer of high salt or solid concentration next to the membrane surface can be avoided or reduced. The characteristics of the pumping system and the liquid flow rate will, of course, be considered in selecting an appropriate clearance. In any event, whatever magnitude of clearance is employed, an important feature is that the clearance be uniform over the membrane surfaces thus insuring even distribution of liquid and uniform, though preferably turbulent, liquid flow.

The material of construction of stuffer 70 will depend on various conditions. It may be plastic as shown, or plastic foam, or other material or combination of materials having the equivalent effect of filling or stuffing excess space around the membrane elements in order to limit and control the liquid flow, at least the interior surfaces being solid and preferably smooth. It may be fabricated by casting, molding, machining, or other suitable method and may be solid, hollow, or of foam-like or composite structure as desired or required. It may be advantageous to fabricate stuffer 70 as a plurality of short sections by an automatic, very inexpensive process such as injection molding. These sections can be stacked and glued together to produce an elongated structure of required design.

Membrane elements 32 are supported at one end by insertion of projecting plugs 46 into bores 58 in support element 56, and at the other end by contact of spacers 45 on plugs 44 with the interior surfaces of the bores in stuffer 70.

Figure 8:
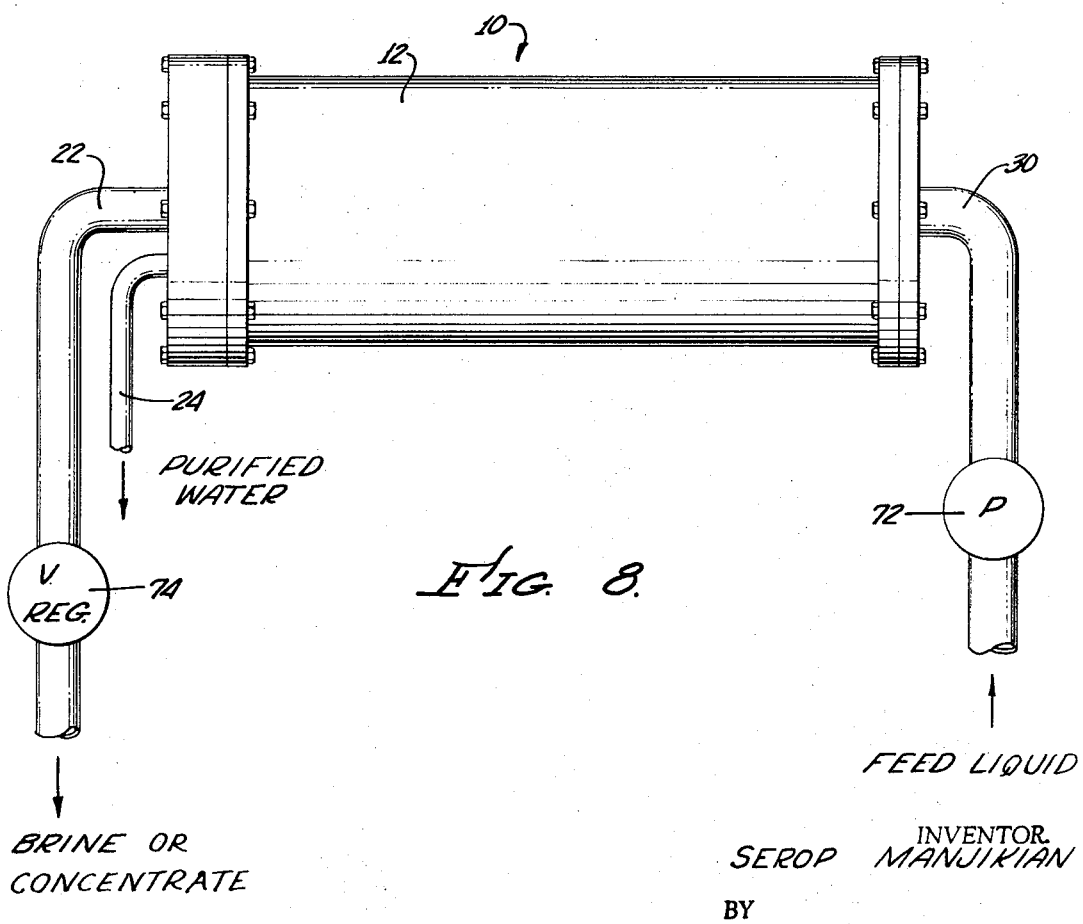
FIG. 8 shows a reverse osmosis system employing the module of FIG. 1.

A reverse osmosis system employing the module of this invention is shown in FIG. 8. The feed water connector 30 is connected by suitable piping to high pressure pump 72, the inlet of this pump being supplied with feed water to be purified. The brine outlet connector 22 is connected by suitable piping to back pressure regulator valve 74 which outlets brine at controlled pressure to sewer or recycle or for any desired use. Purified water from connector 24 may be coupled to transfer or storage facilities not shown.

In operation, the module of this invention may be employed in a reverse osmosis system such as that illustrated in FIG. 8. A supply of liquid to be treated is connected to the inlet of high pressure pump 72. The feed may, for example, be tomato juice which it is desired to concentrate. Pump 72 is a commercially available type capable of raising the feed liquid pressure to at least 800 psig. The tomato juice is pumped into module 10 through connector 30 and the discharge or release of the concentrate is regulated by valve 74 to maintain pressure in the module at about 800 psi. Water separated from the tomato juice is collected from the interiors of the membrane elements and released through connector 24, and in this case this water or purified liquid is not the principal product. The original tomato juice feed can, by passage through module 10, be concentrated so that 80 percent or more of its water content is removed. Since this is accomplished without boiling or evaporation, many volatile components that might otherwise be lost are preserved.

The module 10 contains a plurality of membrane elements 32, four being shown by way of example, although more or less than this number may be employed depending on the relative diameters of the membrane elements and module shell, and the packing arrangement. A single membrane element inside a cylindrical pressure container is inefficient since a pressure vessel must be provided for each membrane element. When a plurality of membrane elements are packed into a single cylindrical pressure vessel, the cost of the pressure container per unit of membrane area, or number of elements, is much reduced. However, controlling the feed water flow through the container so that efficient contact and turbulent flow is maintained over all of a number of membrane surfaces is extremely important to produce operating efficiency and long membrane life. The design of the module of this invention permits packing a plurality of membrane elements into a single pressure vessel while at the same time maintaining uniform flow of liquid over all membrane surfaces.

Uniformity of spacing between the interior surfaces of stuffer 70 and the membrane covered outer surfaces of membrane elements 32 is important in the design of the module of this invention. Uniformity of spacing between these elements provides uniform flow of liquid over the membrane covered surfaces of the membrane elements. Uniform flow, considered to be flow of substantially uniform volume and velocity, is helpful to prevent some membrane areas from receiving greater or less volume or velocity of feed liquid. Such imperfect distribution of feed results in poor liquid flow over some areas which could result in intensified boundary layer effects, inefficient membrane operation and deposition or collection of deposits, suspended solids or slime from the feed. Since the membrane elements may all be of essentially the same length, uniform spacings around each membrane element enclose channels of uniform dimensions which insure uniform liquid flow over each membrane surface. It is necessary for best flow control to supply the feed water uniformly to these channels since the flow control channels between the stuffer interior surfaces and the membrane surfaces cannot act most effectively unless feed water is introduced uniformly into each one. This is accomplished in the embodiment described by the flaring design of end piece 48 which distributes the feed liquid from connector 30 substantially uniformly over the end areas of the spaces between the membrane surfaces 40 and the interior surface of the bores in stuffer 70; this uniform distribution occurs principally because the total area of the membrane channel space is much smaller than the diameter of the flared inlet flow passage at this point, and also the membrane channel spaces are symmetrically arranged with respect to the flared passage.

The module of this invention, while it may be modified to treat a variety of feed liquids, is particularly adapted for treatment of food products. The spacing between the interior surfaces of stuffer 70 and the membrane covered surfaces of membrane elements 32 can be great enough to permit treatment of thick, viscous, or solid containing liquids such as fruit or vegetable juices or dairy products such as whey, while still maintaining desirable flow conditions. Reverse osmosis has been found to be an advantageous process for concentrating such solutions, and the concentrate may be the desired product instead of a purified liquid produced by treating brackish or sea water. Such materials might rapidly clog or could not be readily pumped through modules having fine clearances over membrane surfaces such as are inherent in a spiral wound module or a module containing membranes in the form of very fine, hollow fibers. Stuffer 70 may be easily and economically designed with suitable clearance for operation under any required conditions.

Additionally the module of this invention has an important advantage for food processing in that it can be readily disassembled for cleaning or sterilization. It is a simple matter to disconnect end plate 20 by removing bolts 18. This exposes the end of the stuffer 70 and the end plugs 46 of membrane elements 32. Stuffer 70 may be removed from shell 12 together with the membrane elements 32 in place. These parts may readily be separated for cleaning or sterilization. Then the membrane elements 32 and stuffer 70 may be reassembled inside shell 12, and end plate 20 replaced and fastened onto shell 12 by retightening bolts 18.

Another advantage of this invention is that stuffer 70 may be readily removed and replaced with a stuffer of the same outside dimensions, to fit the pressure container, but with different size bores so that the spacing and size of the liquid flow passages over the membrane surfaces are changed. Thus, for example, a stuffer having relatively large bores providing relatively large cross section flow channels may be employed when the module is employed for concentrating thick or viscous liquids such as fruit juice. A stuffer with relatively small bores may replace the one with larger bores if smaller clearances over the membranes are desired for treatment of more fluid liquids such as in the desalination of brackish water. Even though a liquid of low viscosity is being treated, a stuffer with larger bores to provide larger clearances may be desirable to insure open and non-clogging flow of a fluid that may contain suspended solids. This arrangement can be advantageously designed to eliminate or reduce pre-filtering requirements and thus avoid expensive processing to prepare a liquid for reverse osmosis treatment. On the other hand, if a very clean, low viscosity feed water is to be treated a stuffer providing less clearance over the membrane surfaces may be used to obtain best osmotic efficiency and boundary layer control with high recovery using a minimum feed water flow through the system and corresponding economy in pumping.

Removal or replacement of the stuffer with the membrane elements in place is another important advantage of the module of this invention. In the embodiment employing this feature the stuffer performs a dual function; first as a stuffer to fill excess space and control liquid flow and, second, as a magazine to contain or hold the membrane elements in their relative operating positions. This is a substantial benefit when the module contains a large number of membrane elements which are difficult or laborious to assemble one by one into the stuffer bores inside the pressure container. With the stuffer removed from the pressure container it is a simple matter to load it with membrane elements and then insert the stuffer and membrane elements as a single unit into the pressure container. Removal of the stuffer and elements as a unit can also simplify membrane element removal as will be apparent.

I claim:
1. In a module, useful in systems for treatment of a liquid by reverse osmosis, comprising a pressure resistant container, a plurality of membrane elements having membrane covered outer surfaces in said container, means for introducing feed liquid under pressure into said container, means for releasing concentrated liquid, and means for collecting purified liquid from said membrane elements, the improvement comprising:
  a. a stuffer in said container having substantially parallel surfaces adjacent to and spaced apart from the elements; and,
  b. means for introducing said feed liquid into the spaces between the surfaces of said stuffer and the membrane surfaces of said membrane elements;
  c. said stuffer controlling the flow of feed liquid over the membrane covered surfaces of said membrane elements.

2. A module according to claim 1 in which the substantially parallel surfaces of said stuffer are spaced apart a uniform distance from said membrane covered surfaces of said membrane elements so that said liquid may be controlled to flow uniformly over said membrane covered surfaces of said membrane elements.

3. A module according to claim 1 in which said pressure resistant container is tubular.

4. A module according to claim 3 in which said stuffer occupies substantially all the space inside said tubular pressure resistant container around the membrane covered surfaces of said membrane elements except the spaces between interior surfaces of said stuffer and membrane covered surfaces of said membrane elements.

5. A module according to claim 3 in which said stuffer comprises a cylindrical body having a plurality of longitudinal bores with interior surfaces surrounding the membrane covered surfaces of said membrane elements, said bore interior surfaces being spaced apart a uniform distance from the membrane covered surfaces of said membrane elements.

6. A module according to claim 1 in which said stuffer comprises a plastic body.

7. A module according to claim 1 in which said means for introducing feed liquid into the spaces between the interior surfaces of said stuffer and the membrane covered surfaces of said membrane elements comprises a chamber into which said feed liquid is introduced, said chamber having a cross sectional area, where it communicates with the spaces between the surfaces of said stuffer and the membrane covered surfaces of said membrane elements, substantially greater than the total cross sectional area of said spaces.

8. A module according to claim 7 in which said chamber has flaring sides.

* * * * *